(12) United States Patent
DeSorbo

(10) Patent No.: US 7,621,681 B2
(45) Date of Patent: Nov. 24, 2009

(54) HANDLEBAR SUPPORT APPARATUS

(75) Inventor: Alexander P. DeSorbo, Woodbury, CT (US)

(73) Assignee: Anton/Bauer, Inc., Shelton, CT (US)

( * ) Notice: Subject to any disclaimer, the term of this patent is extended or adjusted under 35 U.S.C. 154(b) by 604 days.

(21) Appl. No.: 11/406,856

(22) Filed: Apr. 19, 2006

(65) Prior Publication Data

US 2007/0248351 A1    Oct. 25, 2007

(51) Int. Cl.
*G03B 17/00* (2006.01)

(52) U.S. Cl. ............... 396/420; 224/575; 224/270; 224/908

(58) Field of Classification Search ......... 396/419–426, 396/428; D16/242–245; 224/101, 270, 575, 224/908
See application file for complete search history.

(56) References Cited

U.S. PATENT DOCUMENTS

| | | |
|---|---|---|
| 2,684,822 A | 7/1954 | Odin |
| 3,133,719 A | 5/1964 | Beck |
| 3,804,356 A * | 4/1974 | Olds .................. 248/179.1 |
| 3,893,144 A * | 7/1975 | Funderburk ............ 396/425 |
| 4,050,796 A | 9/1977 | Komine |
| 4,329,041 A | 5/1982 | Madge et al. |
| 4,405,223 A | 9/1983 | Shull |
| 5,043,750 A | 8/1991 | Yamaguchi |
| 5,081,478 A | 1/1992 | Hayashida et al. |
| 5,585,849 A | 12/1996 | Robalino |
| 5,721,997 A | 2/1998 | Powell et al. |
| 6,007,259 A | 12/1999 | Mori et al. |
| 6,068,223 A | 5/2000 | Navarro |
| 6,685,148 B2 | 2/2004 | Zadok |
| 6,697,118 B2 | 2/2004 | Zadok |

* cited by examiner

*Primary Examiner*—William B Perkey
(74) *Attorney, Agent, or Firm*—McCormick, Paulding & Huber LLP (57) ABSTRACT

A fully adjustable, handlebar support apparatus is readily attachable to a hand held video or still camera or to another support device, such as a monopod or tripod and includes a flexible, articulating handle which may be grasped by the camera operator and selectively manipulated to exhibit an infinite range of possible contours to the flexible handle.

19 Claims, 5 Drawing Sheets

HANDLEBAR SUPPORT APPARATUS

FIELD OF THE INVENTION

The present invention relates generally to optical recording devices, and more particularly to a support apparatus for hand held video or still cameras.

BACKGROUND OF THE INVENTION

A wide variety of support systems have been provided in the prior art for holding a hand held camera steady.

However, most camera support systems are rudimentary and largely ineffective, while others are complicated and expensive. Generally, known camera support systems employ rigid bars or un-yielding structural elements that are attached to a camera, therefore making their adjustment extremely difficult, time-consuming and limited in scope.

It is known in the art to provide a support system for a camera in which actual pipe or tube elements are joined together by known pipe fittings, such as right-angle fittings. While such systems certainly may provide the rigidity and strength to support the weight of the camera unit during operation, it should be readily appreciated that the flexibility and orientation of known pipe support systems is severely restricted. That is, as these systems are formed from rigidly connected pipe elements, the range of possible motion of the camera unit is inherently restricted to only those motions or orientations permitted by the innate structure of the system.

Still other support systems for cameras are known in which a complex array rigid structural members form a superstructure which is adapted to rest upon the shoulders or upper torso of an operator. Once so mounted upon an operator, these known superstructures also have inherent restrictions as to the range of possible movement of the camera unit. Moreover, the size and weight of these superstructures make their use difficult and laborious.

It will therefore be readily appreciated that known support systems for optical recording units are universally deficient as being fabricated from rigid and cumbersome constituent elements. The rigidity of these constituent elements is such that the ability to position the optical recording unit as desired is oftentimes hampered by the lack of flexibility inherent in these known systems.

With the forgoing problems and concerns in mind, it is the general object of the present invention to provide a handheld support apparatus for optical recording devices which is formed from inherently flexible elements, thus improving the handling of the device to an extent heretofore known in the art.

SUMMARY OF THE INVENTION

It is one object of the present invention to provide a support apparatus for optical recording devices.

It is another object of the present invention to provide a support apparatus for optical recording devices that is compact in size and weight.

It is another object of the present invention to provide a support apparatus for optical recording devices that is flexible in nature.

It is another object of the present invention to provide a support apparatus for optical recording devices that is formed from a single, flexible handle.

It is another object of the present invention to provide a support apparatus for optical recording devices that is formed from a pair of operatively connected flexible handles.

It is another object of the present invention to provide a an inexpensive, easy to use, fully adjustable, hand held camera handlebar support apparatus which employs a flexible or articulating handle which may be grasped by the camera operator and easily moved between an infinite array of positions.

As a salient feature of one embodiment, the flexible handles of the support apparatus may be releasably interconnected to form a single member which can be grasped by one hand or by both hands of the camera operator; or the flexible handles may be spaced apart from each other to form separate members to define an ellipse, circle, diamond, or square, which may be grasped by both hands of the camera operator.

The support apparatus hereof is so configured as to allow its easy attachment to a camera and to permit its easy assembly to another support device, such as a monopod or tripod.

As still a further feature hereof, the flexible, articulating handles include one or more flexible arms which are attached to a central hub and are formed from such as flexible metal tubing or any flexible material which can be manipulated to assist in the handling of the camera.

Articulation of the handles may also be obtained by such as ball and socket joints attached to a central hub whereby the flexible handles may be moved in a half spherical arc around both sides of the camera.

As another feature worthy of particular note, the flexible, articulating handles are provided with soft, deformable gripping portions which have the ability to flex to provide sure and comfortable manipulation of the support apparatus, without impairing the adjustment capabilities of the support apparatus.

These and other objectives of the present invention, and their preferred embodiments, shall become clear by consideration of the specification, claims and drawings taken as a whole.

DETAILED DESCRIPTION OF THE PREFERRED EMBODIMENT

Figure 1:
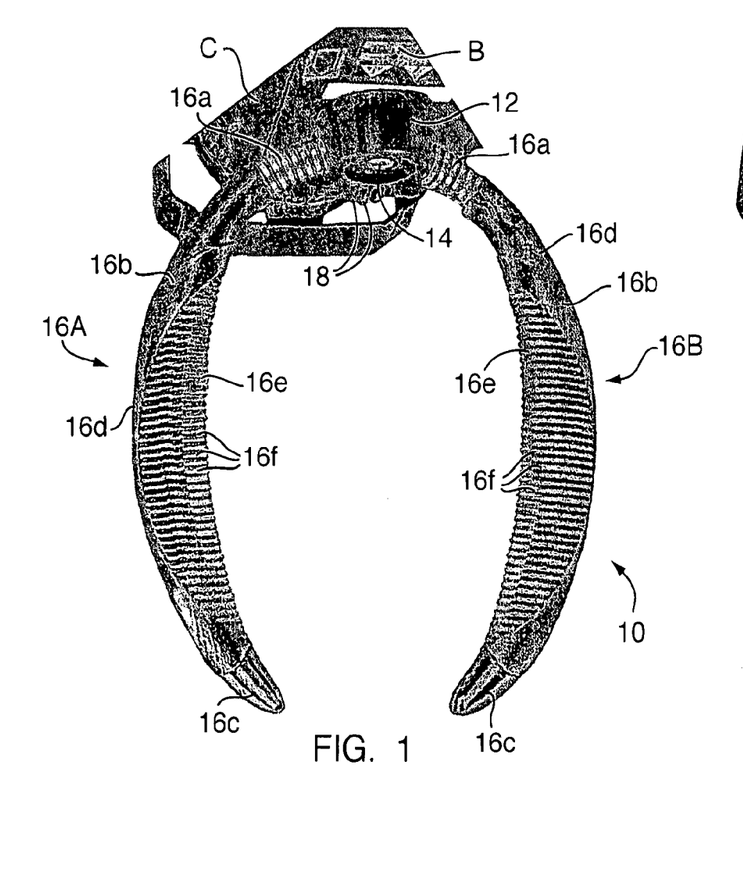
FIG. 1 is a perspective view of handlebar support apparatus embodying a preferred embodiment of the invention mounted on a camera and showing the articulated handles thereof in a substantially vertical position.
Figure 2:
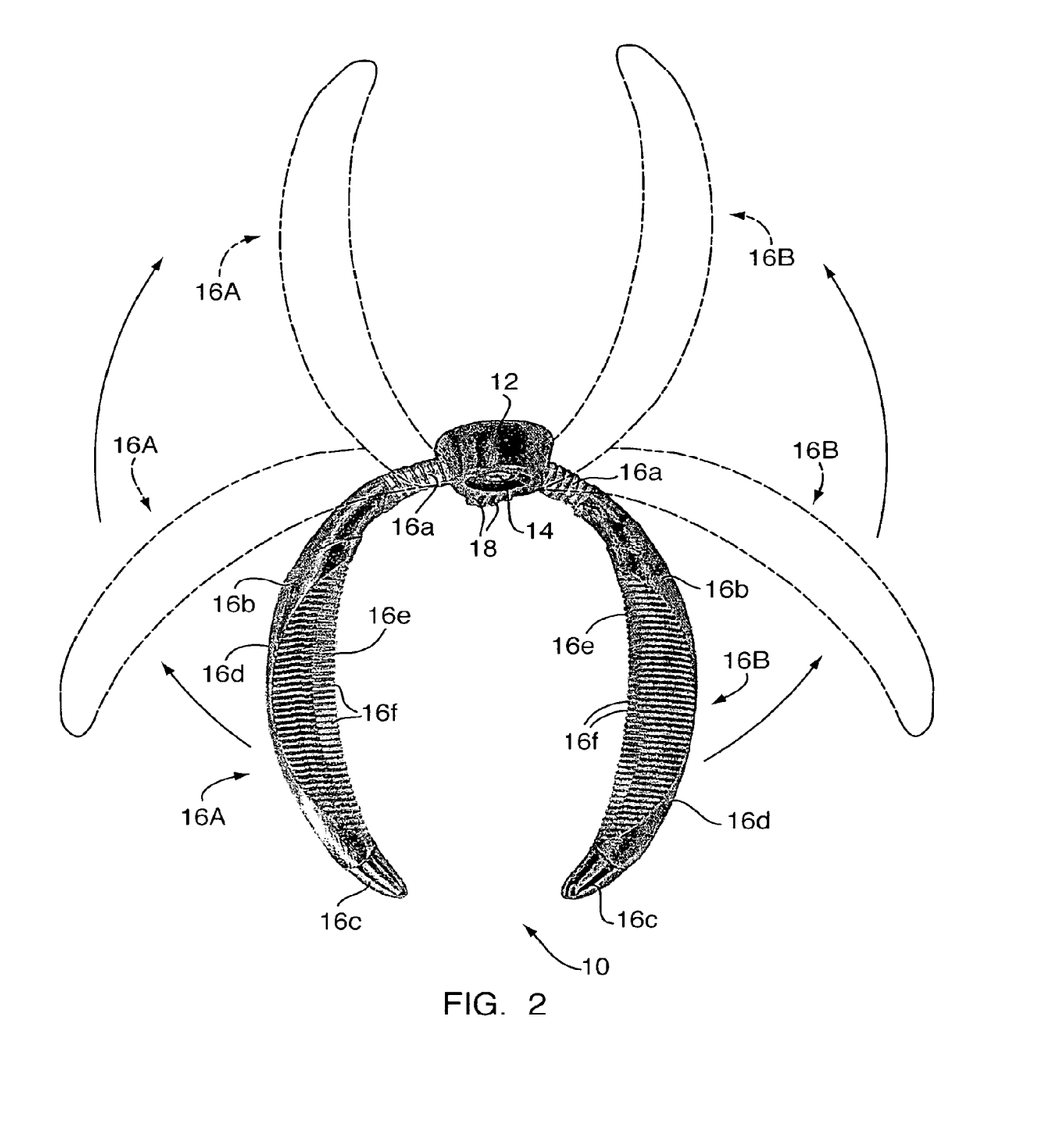
FIG. 2 illustrates the range of possible positions for the handle(s) of the support apparatus, in accordance with one embodiment of the present invention.

Referring first to FIGS. 1 and 2 of the drawings, handlebar support apparatus embodying a preferred form of the invention is generally indicated by 10 and is mounted on a base B of a camera C.

Handlebar support apparatus 10 includes an attachment means, such as a central circular hub 12, which is engageable with base B of camera C, either directly engagable via a threaded insert or stud or a similar mechanical engagement or fixation (not shown) provided on the base, or indirectly engagable through the use of an intermediary attachment means, such as those attachment means known as a quick release shoe and receive (also not shown). Moreover, it should be noted that support apparatus 10 may be attached to any intermediary means disposed between the support apparatus and the camera, such as a battery or accessory device.

A mounting means 14 is provided in hub 12 to permit the attachment of support apparatus 10 to such as a monopod, tripod, or other support, not shown. A pair of spaced flexible, mirror image, arcuate, left and right articulating handles, generally indicated by 16A and 16B respectively, are operatively connected to the outer periphery of hub 12 at its central longitudinal axis, with handle 16A extending outwardly from one side of the hub and handle 16B extending outwardly from an opposite side.

A plurality of spaced parallel struts 18 extend radially outwardly from one side of hub 12 between articulating handles 16A and 6B for providing additional strength to the hub and added support for the apparatus.

Articulating handles 16A and 16B are substantially identical; thus, only one thereof will be described in detail herefollowing.

Each articulating handle 16A and 16B includes a flexible arm portion 16a and a soft, deformable, arcuate, hand grip portion 16b, with flexible arm portion 16a being connected at one of its ends to one side of hub 12, and with hand grip portion 16b being connected at one of its ends to the opposite end of flexible arm portion 16a and having an outer free end portion 16c. The handle(s) 16 are operatively connected to the hub 12 via a rotatable joint which permits the handle(s) 16 to have a 360° range of movement with respect to the hub 12.

It will be readily appreciated that although a pair of operatively connected handles 16A and 16B have been shown in FIG. 1, the present invention is not so limited in this regard. Indeed, another embodiment of the present invention resides in having only a single, flexible handle member, the midpoint of which being positioned approximately at the center of the hub 12, and the two distal ends forming the handle portions 16A and 16B shown in FIG. 1.

Moreover, while handles 16A and 16B have been described as supporting a deformable hand grip portion 16b, it will be understood that the deformable portion may be absent from the handles 16A and 16B without departing from the broader aspects of the present invention.

Figure 3:
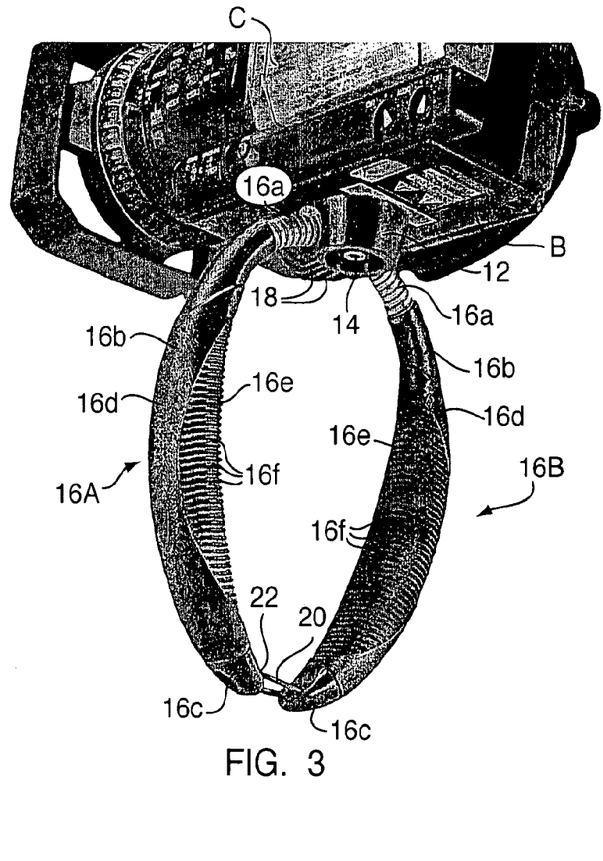
FIG. 3 is a perspective view of the handlebar support apparatus of FIG. 1, showing the outer ends of the articulated handles thereof releasably interconnected.
Figure 6:
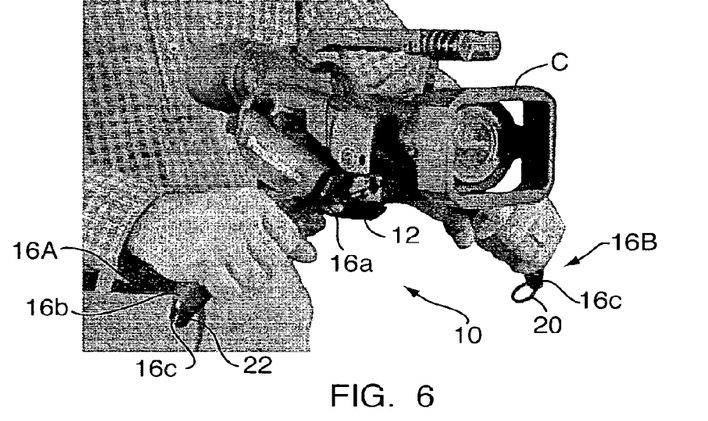
FIG. 6 is a perspective view of the handlebar support apparatus and camera of FIG. 3 and showing another manner of grasping the articulated handles of the support apparatus with a downwardly directed force exerted by the hands of a camera operator.

Returning to FIG. 1, a latch means 20 is pivoted to outer free end portion 16c of one articulating handle 16A or 16B and is releasably engageable with a catch 22 provided on outer free end portion 16c of the other articulating handle whereby the outer free ends of the articulating handles may be held together as shown in FIGS. 3 and 6 to form a single support member in which articulating handles 16A and 16B are capable of moving in unison throughout their possible range of motion relative to hub 12.

Indeed, an important aspect of the present invention is the flexible nature of the handles 16A/16B, whether they are two separate handle portions, or whether they are, alternatively, a single handle portion/element. By forming handles 16A/16B to be flexible along the entire length thereof, the handles 16A/16B of the present invention may be selectively and flexibly deformed to define an infinite array of possible configurations, from a substantially straight orientation to a curved orientation. Thus, the handle(s) 16 may be selectively given any desired contour, as well as any desired orientation (relative to the optical recording unit and to themselves). Further, the handles 16A/16B are formed from a material and through a process that results in the handle(s) 16 being capable of maintaining their shape and orientation, after deformation of the handles 16A/16B by an operator.

Thus, the support apparatus for optical recording devices as proposed in the present application provides a level of adjustability and flexibility not heretofore found in known support systems, which themselves utilize rigid members not capable of selectively flexing to accommodate the wishes of an operator.

Of the infinite number of possible configurations, FIG. 2 illustrates three discrete possible positions for the handle(s) 16. As shown by the arrows in FIG. 2, the handle(s) 16 may be selectively adjusted to positions below, above or to the sides of an optical recording unit attached to the hub 12. Indeed, another important aspect of the present invention is that the flexible nature of the handle(s) 16 permits each end to be independently adjusted, so that one end of the handle(s) 16 may be positioned above the optical recording unit, while the other end may instead be positioned to the side, or to the bottom, of the optical recording unit.

Indeed, as mentioned previously, the handle(s) are flexible along their entire length. That is, although each of the handle (s) 16 shown in FIGS. 1 and 2 display a C-shaped contour, the present invention is not so limited in this regard as the handle (s) may be selectively contoured by an operator to be straight in shape, or S-curved, or the like. Moreover, although only three discreet positions of the handle(s) 16 are shown in FIG. 2, it will be readily appreciated that the position and configuration of the handle(s) 16 are not limited to these three discreet positions. Indeed, the handle(s) 16 are comprised as flexible members, each of which are capable of being manipulated into any of an infinite number of possible configurations and contours, FIG. 2 being merely illustrative and suggestive of the range of motion in this regard.

As seen in FIG. 3, articulating handles 16A and 16B exhibit one of their possible configurations by being disposed substantially perpendicular to camera base B whereby they may be grasped by one hand or both hands of the camera operator.

When latch means 20 is not engaged with catch 22, each articulating handle 16A and 16B is capable of independent movement relative to hub 12 so as to provide for an infinite number of possible configurations.

In FIG. 1, because the latch means 20 is not engaged between handle(s) 16, the articulating handles 16A and 16B are free to move either in unison or separately depending upon how the handles are grasped and moved by the camera operator.

Figure 4:
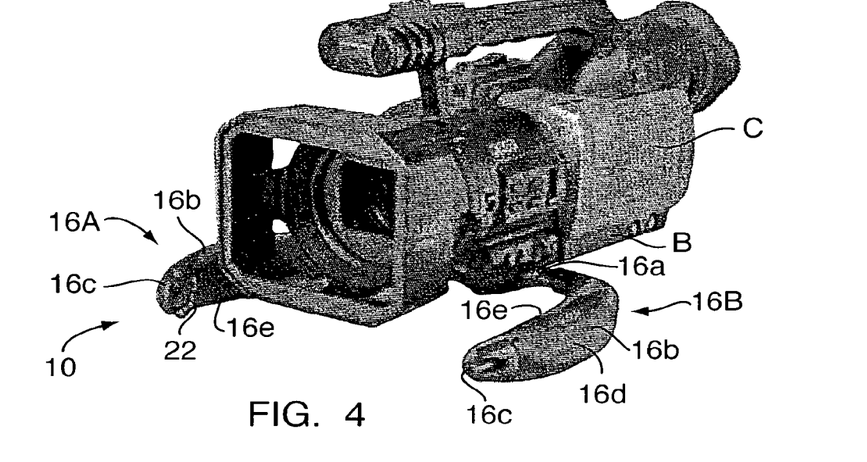
FIG. 4 is a perspective view of the handlebar support apparatus of the invention mounted on a camera and showing the articulated handles thereof in a substantially horizontal disposition with their outer free ends spaced apart.

While the present invention has hereto been described in terms of the infinite number of possible positions that the handle(s) can be disposed for grasping by an operator, the utility of the present invention extends far beyond this limited scope. As best seen in FIG. 4, the articulating handles 16A and 16B have been moved to a substantially horizontal disposition immediately below the camera base, with their outer free ends 16c spaced widely apart from each other. In the configuration of FIG. 4, the handle(s) 16 provide a stable base for the camera C and provide a utility quite apart from heir utility as manual grasping elements. Indeed, as depicted in FIG. 4, the support apparatus of the present invention is equally capable of supporting the camera C even on uneven terrain, as the handle(s) may be independently manipulated by an operator to accommodate a sloped, stepped, or otherwise uneven, surface.

With further respect to FIG. 4, it should be noted that not only does the flexible nature of the handle(s) 16 enable the setting of the optical recording unit on uneven terrain, but ensures that an operator does not have to disengage the support apparatus from the optical recording device after each use. That is, the support apparatus of the present invention permits the operator to selectively contour the handle(s) as desired, yet there is no need for the support apparatus to be removed from the optical recording device should the operator have to place the optical recording device down, as the handle(s) will also provide a cushioned base upon which the optical recording device may sit (as shown in FIG. 4).

It should therefore be readily appreciated that as opposed to known prior art devices made from rigid constituent elements, the infinite flexibility of the handle(s) of the present invention gives operators an ease of use and an increased functionality not to be found in known devices.

Yet another important aspect of the present invention is the relative small size and lightweight design of the present support apparatus. As shown in FIGS. 1-4, and again as opposed to large prior art superstructures, the support apparatus of the present invention is far smaller and less weighty than even the camera itself. Thus, the present invention is easily mobile, limits the operator fatigue during its use, and may be left connected to the camera even when it is not being actively utilized.

Figure 5:
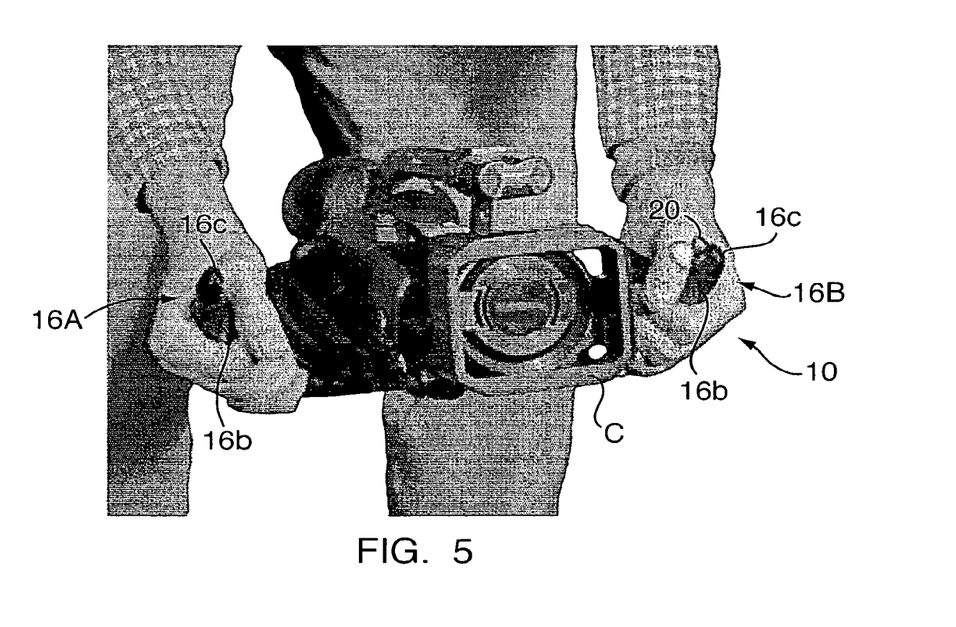
FIG. 5 is a perspective view of the handlebar support apparatus and camera of FIG. 3 and showing one manner of grasping the articulated handles of the support apparatus with an upwardly directed force exerted by the hands of a camera operator.

Turning now to FIG. 5, the articulating handles 16A and 16B are shown as being in a somewhat horizontal disposition adjacent each side of camera B, each end of the handle(s) 16 being turned up at the distal end thereof while being grasped by each hand of the camera operator.

FIG. 6 illustrates a similar arrangement, with the articulating handles 16A and 16B being in a somewhat downwardly directed angular disposition adjacent each side of camera C while being grasped by each hand of the camera operator, the outer distal free ends 16c of articulating handle(s) 16 being directed downwardly.

Figure 7:
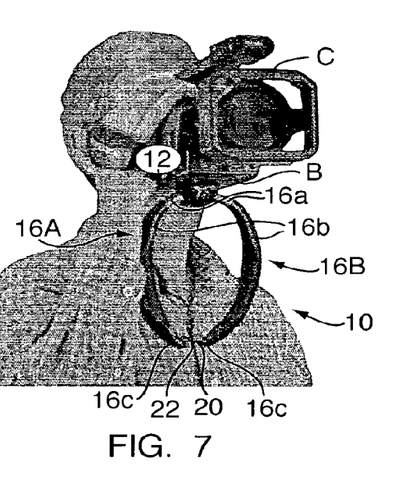
FIG. 7 is a perspective view of the handlebar support apparatus and camera of FIG. 3 and showing the articulated handles of the support apparatus in a vertical disposition with their outer ends releasably interconnected and resting on the chest of a camera operator to support the camera which is grasped by one hand by the operator.
Figure 8:
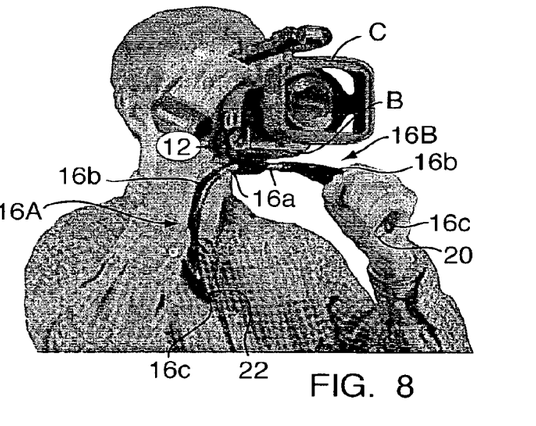
FIG. 8 is a perspective view similar to FIG. 6 showing one of the articulated handles of the handlebar support apparatus of the invention in a substantially vertical disposition with its lower end resting on the chest of the operator to support the camera and showing the other articulated handle in a substantially horizontal disposition and grasped by one hand of the operator to further support the camera while the operator's other hand grasps the camera.

FIGS. 7 and 8 further show the utility of the present invention as the distal ends of the handle(s) are used for bracing purposes, as well as being disposed in a non-aligned configuration with one another. As seen in FIG. 7, the articulating handles 16A and 16B are disposed substantially perpendicular to camera base B with one free distal end 16B supported against the arm/wrist region of the camera operator, who is grasping the camera with one hand.

It will be apparent from a review of FIG. 7 that the stability of the overall system is greatly increased by disposing one free distal end of the handle(s) against the body of the operator during shooting.

The independent flexibility and functionality of the handle(s) is profiled in FIG. 8, in which the articulating handle 16A is shown as being in a substantially vertical disposition with its lower free end 16B supported against the arm/wrist region of the camera operator. The free distal end of the other articulating handle 16A, however, is flexed outwardly and somewhat downwardly and grasped by one hand of the operator whose other hand grasps the camera.

While FIGS. 5-8 each illustrate the support apparatus 10 of the present invention as it is employed by an operator, these drawing figures are not meant to limit the functionality of the present invention in any way. That is, the specific shape and configuration of the handle(s) 16 shown in FIGS. 5-8, as well as the particular depiction of the operator in FIGS. 5-8, are merely illustrative and do not depict the full range of movement of the handle(s) 16, nor are they meant to illustrate all possible uses of the support apparatus 10 as it is employed by an operator.

As discussed previously, the handle(s) 16 is comprised mainly of a flexible arm portion 16a that itself may be covered by a deformable grip portion 16b. The flexible arm portion 16a is preferably flexible along its entire length and is formed from such as metal, segmented tubing, a polymer rod, or the like, although any flexible material may be utilized. Alternatively, the flexible arm portion 16a may be replaced by such as a ball and socket joint, not shown, to permit movement of the articulating handles relative to hub 12 in a half spherical arc around both sides of camera C.

The flexible hand grip portion 16b includes a convex, smooth outer face 16d and a concave inner face 16e which has a plurality of spaced, parallel, resilient teeth 16f provided along its length extending inwardly therefrom.

The teeth 16f provide a firm, yet deformable, gripping surface and may be compressed together to permit the hand grip portion 16b to be deformed when grasped by a hand to flex and form about an operator's hand. While the hand grip portion 16b and the deformable teeth 16f are not necessary for the functioning of the present invention, their presence provides a tactile sensation and slip-resistant surface to the operator. It should therefore be readily appreciated that the teeth 16f can have any particular configuration about the handle(s) 16 without departing from the broader aspects of the present invention. For example, the teeth 16f may alternatively be formed about the entire periphery of the handle(s) in order to provide a deformable gripping surface regardless of the position or flexing of the handle(s).

It will be apparent from the foregoing that the handlebar support apparatus hereof may be easily attached to a hand held camera and to another support device, such as a monopod or tripod, while providing a flexible or articulating handle having gripping surfaces which flex for movement between a wide variety of shapes and contours. Moreover, as utilized herein, the phrase 'optical recording apparatus' is meant to encompass all video, film, still and digital devices which are capable of capturing images in any of the known electromagnetic spectrums.

Figure 9:
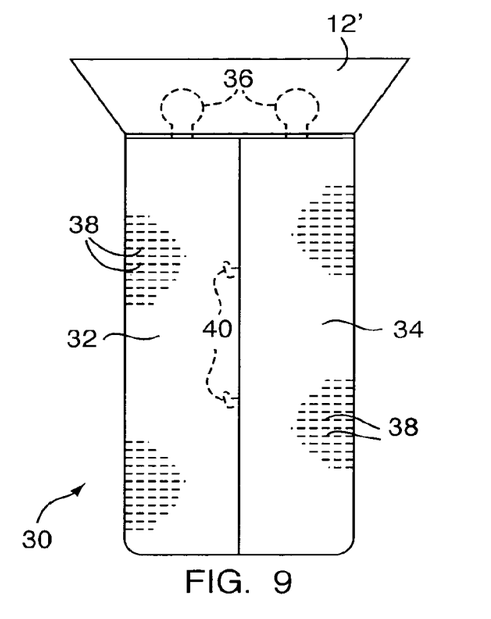
FIG. 9 illustrates a support apparatus according to another embodiment of the present invention.
Figure 10:
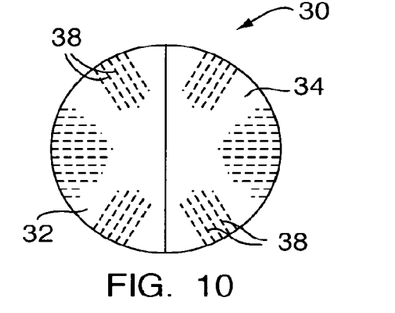
FIG. 10 is a bottom view of the support apparatus illustrated in FIG. 9.
Figure 11:
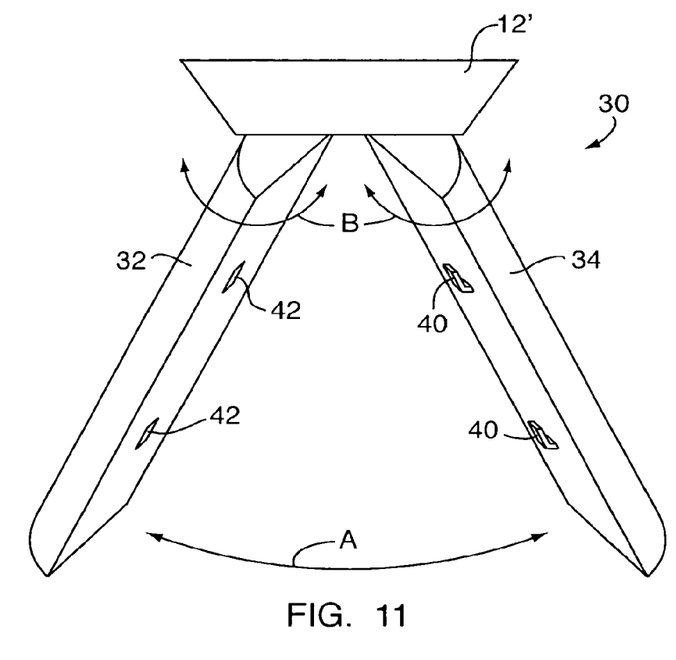
FIG. 11 illustrates the support apparatus of FIG. 9 as the two handle portions are being manipulated into a desired orientation.

FIGS. 9-11 illustrate yet another embodiment of the present invention. As shown in FIG. 9, a support apparatus 30 includes selectively integral handles 32 and 34 which are each rotatably connected to a hub 12' for selective 360° movement in relation thereto. The handles 32 and 34 may be movably secured to the hub 12' via a ball joint and post assembly 36, although other known mechanical couplings could be employed without departing from the broader aspects of the present invention.

It will be readily appreciated that hub 12' is substantially akin to the hub 12 previously described, and is likewise designed to be releasably threadedly engaged with an electronic device, camera, camcorder or the like. Moreover, also akin to the previously disclosed embodiments, the handles 32 and 34 may include a plurality of outwardly extending resilient teeth 38 provided along their length. The teeth 38 provide a firm, yet deformable, gripping surface and may be compressed together to be deformed when grasped to flex and form about an operator's hand. While the deformable teeth 38 are not necessary for the functioning of the present invention, their presence provides a tactile sensation and slip-resistant surface to the operator. It should therefore be readily appreciated that the teeth 38 can have any particular configuration about the handle(s) 32 and 34 without departing from the broader aspects of the present invention.

As shown in FIG. 9, the handles 32 and 34 are in their integrated, or closed, position. As such, the handles 32 and 34 are capable of performing as a single handle and are releasably connected to one another via a pair of resilient latches 40, provided on handle 34. FIG. 10 is a bottom view of the support apparatus 30, illustrating one preferred construction of the handles 32 and 34 in which together they provide a rounded profile to the hand(s) of an operator. Of course, the present invention is not so limited in this regard as the handles 32 and 34 may have any particular outer profile without departing from the broader aspects of the present invention.

FIG. 11 illustrates the handles 32 and 34 in one expression of their split-apart configuration. As shown in FIG. 11, the resilient latches 40 have been manually disconnected from their matching apertures 42 formed in the handle 32, thereby permitting the handles 32 and 34 to rotate away from one another, as generally shown by arrow A. Thus, the present embodiment likewise provides for a pair of selectively-positionable handles 32 and 34. As also shown in FIG. 11, and in addition to the ability of the handles 32 and 34 to selectively move away from one another, each of the handles 32 and 34 may themselves rotate about their own longitudinal axis, as generally represented by respective arrows B. Thus, by utilizing one or both handles 32/34, and by orienting either of the handles 32/34 to a desired position, operability and functionality is greatly increased.

It should therefore be readily appreciated that the support apparatus 30 shown in FIGS. 9-11 also provides to an operator the ability to selectively alternate between a single handle, or a pair of handles, as desired. Moreover, an operator is permitted to rotate and move one, or both, handles 32/34 to any particular configuration, again as desired.

With respect to the embodiment of FIGS. 9-11, the present invention additionally contemplates that the handles 32 and 34 may themselves be formed from a flexible and deformable material, similar to the discussion of the previous embodiments. The handles 32 and 34 may also be crafted from rigid material without departing from the broader aspects of the present invention.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all equivalent embodiments.

What is claimed is:

1. A support apparatus for an optical recording device, said support apparatus comprising:
    an attachment means for selectively coupling said support apparatus to said optical recording device;
    a flexible member operatively connected to said attachment means;
    wherein said flexible member is flexibly and selectively deformable between a substantially straight orientation and a curved orientation and wherein said flexible member is formed as two separate flexible arms, each of said flexible arms having a first end operatively connected to said attachment means, and a second distal end that is not connected to said attachment means; and
    a latching means for selectively and releasably latching said distal ends of said flexible arms to one another.

2. The support apparatus according to claim 1, further comprising:
    a gripping portion disposed about a periphery of said flexible member, wherein said gripping portion includes a plurality of flexible teeth for providing a tactile sensation when grasped.

3. The support apparatus according to claim 1, further comprising:
    said attachment means includes a fastening means for threadedly engaging with said optical recording device.

4. The support apparatus according to claim 1, wherein: said flexible member is flexible along its entire length.

5. The support apparatus according to claim 1, wherein: said flexible member is fashioned from a material that will hold its orientation and shape subsequent to said flexible member being selectively deformed.

6. A support apparatus for an optical recording device, said optical recording device having a threaded mounting hole disposed on a bottom surface thereof, said support apparatus comprising:
    a hub for selectively coupling said support apparatus to said threaded mounting hole;
    a pair of handles operatively connected to said hub; and
    wherein said handles are flexibly and selectively deformable between a substantially straightened shape and a curved shape.

7. A support apparatus for an optical recording device according to claim 6, further comprising:
    a gripping portion disposed on said handles, wherein said gripping portion includes a plurality of flexible teeth defined thereon.

8. The support apparatus according to claim 6, wherein: each of said handles has a first end operatively connected to said hub, and a second distal end that is not connected to said hub.

9. The support apparatus according to claim 8, further comprising:
    a latching means for selectively and releasably latching said distal ends of said handles to one another.

10. The support apparatus according to claim 6, wherein: said handles are fashioned from a material that will hold its orientation and shape subsequent to said handles being selectively deformed.

11. The support apparatus according to claim 6, wherein: said handles are formed on either end of a single handle member, said handle member passing through said hub such that said handles are disposed on substantially opposite sides of said hub.

12. A method of supporting an optical recording device, said method comprising the steps of:

employing an attachment means for selectively coupling said support apparatus to said optical recording device;

operatively connecting a handle to said attachment means; and forming said handle member to be flexibly and selectively deformable so as to define a plurality of differing contours when said handle is selectively deformed.

13. The method of supporting an optical recording device according to claim 12, further comprising the steps of:

disposing a gripping portion about an exterior of said handle, wherein said gripping portion includes a plurality of flexible teeth.

14. The method of supporting an optical recording device according to claim 12, further comprising the steps of:

utilizing a fastening means for threadedly engaging said attachment means with said optical recording device.

15. The method of supporting an optical recording device according to claim 12, further comprising the steps of:

forming said handle as two separate arms, each of said arms having a first end operatively connected to said attachment means, and a second distal end that is not connected to said attachment means.

16. The method of supporting an optical recording device according to claim 15, further comprising the steps of:

equipping said arms with a latching means for selectively and releasably latching said distal ends of said arms to one another.

17. The method of supporting an optical recording device according to claim 12, further comprising the steps of:

forming said handle from a material that will hold its orientation and shape subsequent to said handle being selectively deformed.

18. The method of supporting an optical recording device according to claim 15, further comprising the steps of:

forming said handle to be flexible along its entire length.

19. A support apparatus for an electronic device, said support apparatus comprising:

an attachment means for selectively coupling said support apparatus to said electronic device;

a first handle portion half operatively connected to said attachment means;

a second handle portion half operatively connected to said attachment means;

wherein said first handle half includes a fastening means and said second handle half includes a matching fixation means, said fixation means selectively and releasably accommodating said fastening means so as to selectively form a unitary handle from said first and said second handle portions; and said first handle portion and said second handle portion are flexibly and selectively deformable between a substantially straight orientation and a curved orientation.

* * * * *